United States Patent Office 3,331,783
Patented July 18, 1967

3,331,783
MICROSPHERES CONTAINING COLLOIDAL CARBON
Ann B. Braun, Rockville, and Frederick T. Fitch, Baltimore, Md., assignors to W. R. Grace & Co., a corporation of Connecticut
No Drawing. Filed Apr. 2, 1964, Ser. No. 356,940
8 Claims. (Cl. 252—301.1)

This application is a continuation-in-part of application Serial No. 192,088, filed May 3, 1962, and now abandoned.

This invention relates to methods of preparing spherical particles of controlled size formed of colloidal residues by drying aquasols. In one particular embodiment, it relates to the preparation of dense spheres of nuclear materials, such as uranium carbide and other actinide carbides, which depends on the drying of oxide-carbon colloids to spheres and their sintering and reaction to dense carbide spheres.

In recent years there has been an increased interest in the actinide metal carbides in the field of nuclear fuel development. These carbides may be used in the form of pellets or may be in the form of irregular granules which can be packed to high density by swagging or vibratory techniques. The fabrication of these carbide particles requires compacting or pelleting, followed by prolonged sintering at extreme temperatures. Fuel pellets often must be subjected to precision grinding because of the cladding requirements of the nuclear fuel structures. A preferred form for the carbides is small dense spheres with an impervious coating dispersed in fuel element matrix.

The present methods for the preparation of such spheres are laborious, costly and result in a low yield of microsphere products. From a practical standpoint, they have limited effectiveness. The product itself, which results from the present methods of preparation, suffers from lack of sphericity and uniform structure and frequently exhibits surface irregularities. It is also well known that the strength characteristics of the microspheres prepared by prior art technique leave much to be desired.

The principal difficulties encountered in microsphere preparation are technical difficulties that arise from using refractory carbide powders, from their moisture and air sensitivity, or from the need to use molten materials. Carbide powders have to be compacted before sintering to high densities. A method for preparing these carbide microspheres depends on grinding the carbide powder, compacting, crushing to the desired size range, bringing the particles to a general spherical size and shaped by abrasion techniques and sintering to high density. The material must be sized and recycled at the various stages. The yield in each of the different steps is very low. These procedures are generally unsatisfactory with air and moisture sensitive materials. Alternatively, the very high melting points of the carbides make the use of molten materials very difficult.

We have found that actinide oxide-carbon sols can be used in the preparation of carbide microspheres for eventual use in nuclear fuel elements. The use of these oxide-carbon sols permits relatively simple direct processes for obtaining spherical shapes consisting of a relatively homogeneous mixture of reactive colloidal constituents which require milder conditions of temperature and time for conversion to dense carbides. The uniform microstructure and reactivity of the dried colloidal constituents contributes both to carbide formation, densification and the properties of the resulting spheres. In addition, a wide range of oxide sols are available for use in preparing the carbide microspheres.

In the prior art processes, sphere formation is difficult due to the extremely refractory nature of the carbides. Uniformity in sizing, physical shape and structure is not obtained to the detriment of the product spheres and the processes. The carbides are very reactive with air and water vapor and all work must be done under protective atmosphere because of their pyrophoric nature.

Our novel method of carbide sphere production involves the preparation of aqueous oxide-carbon sols and their use in sol microsphere preparation techniques to obtain directly a dried oxide-carbon microsphere capable of sintering and reacting to form dense carbide microspheres. The materials are not air and moisture sensitive until conversion to carbide in the final process step.

The first step in the process of our application comprises the preparation of oxide-carbon sols.

This process comprises preparing a colloidal carbon system in which fine sized carbon is dispersed in a small volume of water. This dispersion can be conveniently prepared using an ultrasonic probe. However, the dispersion can also be prepared using grinding techniques or a commercially available blending device.

In the next step of the process the aqueous carbon dispersion is added to an actinide oxide aquasol. The sols are mixed thoroughly in the presence of commercially available dispersing agents, such as polyoxyethylene sorbitan laurates, oleates, stearates, etc. The polyoxyethylene sorbitan monolaurate gives good results. A commercially available dispersing agent is preferably added to prevent excessive foaming.

For purposes of simplicity, the preparation of the urania-carbon sols is described in more detail.

In a typical case, a urania sol containing carbon was obtained by mixing a uranium oxide sol containing 10 wt. percent urania with a carbon sol containing 16 wt. percent carbon. The mixture was dispersed with an ultrasonic probe just before use. The $UO_2$ concentration was 9.0 weight percent, the carbon concentration was 1.1 weight percent in the final mixed sol. An electron micrograph of this sol showed dense urania particles of 20 mu diameter.

The carbide microspheres can be prepared using actinide oxides and carbon in preparing the mixed oxide-carbon sol. Actinide oxides include thoria and the oxides of the elements above thorium in the periodic table.

The invention is particularly applicable to the use of thoria, urania, plutonia and mixtures thereof. In addition, these actinide oxides may be mixed oxides with zirconia or hafnia, the rare earths, etc. The actinide oxides or mixed actinide oxide-zirconia or rare earth sol may have a solids content of 1 to about 40 weight percent, preferably about 10%. The final oxide-carbon sol should have a carbon/oxide weight ratio of about 0.12 to 0.22, depending on the carbide composition. For example, uranium dicarbide generally requires a weight ratio of 1.8 to 2.2 using the colloidal constituents.

In the next step of the process, the sol is dehydrated to spheres in a hot solvent column. In this system small droplets of the oxide-carbon sol can be continuously dried to spheres by allowing the droplets to settle through a long column of hot solvent of controlled temperature and water content. The spheres are collected in the bottom cone of the column and are continuously removed, separated from the solvent and dried before sintering to high density.

The solvent is circulated through the column preferably in a counter current direction to a distillation pot for water removal. The distillation pot serves as a solvent reservoir for the system and can be controlled by adjusting water removal and distillation temperature to provide solvents of the desired water content. A water cooler on the input line adjusts the solvent temperature to the desired value. This process provides a wide range of drying conditions and has equipment dimensions within critical limits for handling enriched materials.

A suitable column for this drying is a column 7 feet long and 3 inches in diameter with a conical bottom to collect the settling spheres. The solvent is pumped through a cooler to adjust the temperature at a flow rate of 1 to 2 liters per minute and is pumped into the column four inches from the bottom of the column. The solvent is removed from the column at a point four inches from the top and is passed through flow meters to a distillation pot. The distillation pot is provided with equipment to recycle a portion of the solvent directly to the column. The distillation pot for this particular system has a capacity of 50 liters. Twenty-five liters of solvent are used in operation of the system. The distillation pot is used for water removal and serves as a solvent reservoir for the system. Water removal can be adjusted to maintain a given distillation temperature and water content for the system.

In operation, the sol is injected into the top of the column thru submerged needles or a related droplet sizing device. The droplets dry while settling in one-half to four-fifths of the column length and are collected in the bottom column cone. They are continuously withdrawn from the cone by suction thru a one-eighth inch tube, separated from the solvent and dried prior to sintering to high density.

The choice of the solvents for this system is critically important. The solvents giving the best results are the higher alcohols which have the desired solubility for water. The solvents must be inert, free of objectionable physical properties, such as emulsifying tendencies for example, and must have a density low enough to permit settling, preferably a density below one. The solvents selected must have a saturation concentration with water within a certain range permitting adjustment of drying conditions. Solubilities for water of 3 to 4% to 30% have given satisfactory results. A water solubility of 4 to 12% is preferred for drying a majority of sols in this system. Column dehydrating conditions must be controlled in this manner to prevent deformation and cracking of the spheres due to the large volume changes occurring on solidification.

Examples of suitable solvents include ethyl hexanol, hexanol, butanol, etc. Our invention is further illustrated by the following specific but non-limiting examples.

EXAMPLE I

This example illustrates the preparation of a mixed urani-carbon sol.

A 100 ml. portion of a 10 weight percent urania aquasol was mixed with 2 grams of colloidal carbon which had been previously dispersed in 10 ml. of water using an ultrasonic probe. A slow settling sol resulted. Electron micrographs of the sol revealed the dispersion contained 20 to 40 millimicron carbon particles intimately mixed with 20 to 50 millimicron urania particles.

EXAMPLE II

In this example a urania-carbon sol was prepared using the techniques of Example I with the addition of dispersing agents.

In this run 2.5 g. of colloidal carbon was dispersed in 40 ml. of water, 0.0125 g. of a commercial anti-foam agent and 1.25 g. of a polyoxyethylene sorbitan monolaurate dispersing agent (Atlas Chemical Co.). The mixture was dispersed for 10 minutes using an ultrasonic probe. The mixed sol was allowed to stand for 45 minutes. No residue formed during this time. Electron micrographs showed the sol to have the same particle characteristics of the sols of Example I.

EXAMPLE III

A urania sol containing colloidal carbon was obtained by mixing the uranium sol containing 10 weight percent urania with a carbon sol containing 15 weight percent carbon. The sol mixture was dispersed using an ultrasonic probe. The final sol contained 9 weight percent $UO_2$ and 1.1 weight percent carbon. An electron micrograph of this sol showed dense particles of 20 to 50 mu in diameter, intimately mixed with carbon particles 20 mu in diameter. The carbon sol was prepared by dispersing a commercially available channel black in water. An ultrasonic probe was used to break up the carbon agglomerates to form a uniform dispersion. The urania sol was prepared by autoclaving a uranous chloride solution at 180° C. for a period of 3 hours.

The mixed sol was dried to microspheres by settling through a counter flow column of hot hexanol of controlled temperature and water content. The water was exchanged to the solvent and removed from the solvent in a second distillation step. The equipment used for this run was a 7 foot column, 3 inches in diameter, equipped with a conical bottom for collecting the dried spheres which settled through the solvent mixture. A 50 liter 3-neck stirred distillation flask was fitted with a condenser and solvent water separator and was used for water removal. The separated solvent was returned to the pot and the distillate water either discarded or controlled amounts were returned to the pot, as required, to maintain a given water content or to control the distillation temperature.

This distillation pot also served as a solvent reservoir for the system wherein the solvent was maintained at a given temperature and water content. The slovent was pumped from the distillation pot through a line with heat exchanger and water cooler to adjust the temperature as required. The solvent entered the column four inches from the bottom to provide a slow upward solvent counterflow through the column and to the exit from the column which was 4 inches from the top. The solvent was returned through a flow meter to the distillation pot. In the return solvent line there was a provision for recycle of any desired portion of the solvent flow to the column bottom.

Water was used to establish the operating conditions after which the sol was substituted for water. The sol or water was injected centrally at the top of the column either through a submerged needle, or other device for producing droplets of controlled size, which were dehydrated to dried spheres on passing through the column. The spheres settled and were collected in the cone at the bottom of the column. The dried spheres were continuously removed from the cone bottom through an 1/8-inch Teflon tube by suction and separated in a trap from the solvent which was returned to the distillation pot.

In addition to the water which was added as a sol, water was added through a number 23 hypodermic needle, which was placed in the column at the desired depth. Water was injected through this needle forming a zone of fine spray to maintain the desired water content above the injection point in the column.

The urania-carbon sol was injected at the column top into hexanol. The column was operated at a temperature of 96° C. at the inlet and 76° C. at the outlet. The solvent flow was maintained at a rate of 650 cc. per minute. Water was sprayed in at the rate of 11.3 c. per minute at a distance of 63 inches from the bottom of the column.

The distillation pot temperature was maintained at 105° C. The column was operated to maintain an inlet solvent-water content of about 6 weight percent.

The product recovered consisted of black spheres of uniform surface. Polished sections showed a uniformed defect-free internal structure. The microspheres ranged in size from 130 to 200 microns. The dried spheres were washed with pentane, vacuum dried and heated for two hours at 1585° C. under argon. The spheres retained their shape, uniformity and smooth surfaces during sintering although the surfaces became somewhat dulled. X-ray diffraction studies of the sintered spheres showed uranium monocarbide and uranium dicarbide had formed on sintering.

EXAMPLE IV

A urania-zirconia carbide sol was prepared using the techniques described in Example I. In this run a sol containing 10.7 weight percent urania, 2.0 weight percent zirconia and 2.2 weight percent carbon was prepared by mixing a 23 weight percent zirconia sol with a 15 weight percent urania sol and then blending this mixed sol with a 7 weight percent carbon sol using an ultrasonic probe. The zirconia sol was prepared by autoclaving zirconyl chloride solution at 120° C. for 16 hours. The urania and carbon sols were prepared as described in Example I. An electron micrograph of the three-component sol showed dense urania particles of 20–50 mu in diameter, dense zirconia particles about 80 mu in diameter and carbon particles of 20 mu in diameter. The particles were intimately mixed. The urania-zirconia carbon microspheres were prepared in a column operated under the following conditions:

The solvent used in this run was hexanol. The distillation pot temperature was maintained at 107° C., the column inlet temperature was 98° C. and the outlet temperature 78° C. The solvent flow through the column was 755 cc. per minute. A water spray was injected 63 inches from the bottom of the column at a rate of 7 cc. per minute. The sol was injected at the column top centrally through a device providing uniform droplets of controlled size and shape. The sol was fed into the column at a rate of 1.5 cc. per minute. The column was operated to maintain a solvent-water content of 5 to 6 weight percent.

The products recovered were dried microspheres of uniform surface. They ranged in size from 130 microns to 270 microns. The microspheres, after washing with pentane and vacuum drying, were heated at 1600° C.–1635° C. for 2½ hours under argon. The finished materials were spherical, uniform and smooth surfaced, retaining their physical perfection during densification. The surfaces are slightly grayer and less shiny than those of the green spheres. The spheres were pyrophoric on crushing, which is characteristic of carbide materials. X-ray diffraction patterns showed that primarily uranium monocarbide had been formed. Uranium dicarbide in small amounts was also indicated. The uranium monocarbide lines were shifted indicating solid solution with the zirconium monocarbide to the extent of about 70 to 80 percent of stoichiometric quantities. Thus conversion to dense uranium and zirconium monocarbides occurred readily even with this limited sintering.

Obviously many modifications and variations to the invention may be made without departing from the essence and scope thereof and only such limitations should be applied as are indicated in the appended claims.

What is claimed is:

1. A process for preparing dense carbide spheres having diameters in the range of 5 to 500 microns which comprises dispersing a mixed sol of actinide oxide and carbon to form droplets of uniform size and concentration, drying said droplets at a controlled rate and temperature to maintain their spherical form, recovering the dried sinterable colloidal oxide-carbon spheres and sintering to a high density carbide product.

2. A process for preparing dense carbide spheres having diameters in the range of 5 to 500 microns which comprises dispersing a mixed sol of an actinide oxide and carbon to form droplets of uniform size and concentration, drying said droplets on contacting with an immiscible solvent of limited solubility for water, recovering the dried, sintering colloidal oxide-carbon spheres and sintering to a high density carbide product.

3. A process for preparing dense carbide spherical particles having diameters in the range of 5 to 500 microns which comprises:
 (a) Forming uniform droplets of mixed actinide oxide-carbon aquasols at the top of a column of a counterflowing, partially immiscible solvent heated to a temperature of 0 to 50° C. below the water solvent system boiling point;
 (b) Drying said droplets to dried sinterable colloidal oxide-carbon spheres on settling through the solvent column, while,
 (c) recirculating the solvent through a distillation system to remove water,
 (d) recovering the settled spheres, and
 (e) drying and sintering to dense carbide spheres.

4. A process for preparing dense carbide spherical particles having diameters in the range of 5 to 500 microns which comprises:
 (a) Forming uniform droplets of an oxide-carbon aquasol of an oxide selected from the group consisting of actinide oxides, mixtures of actinide oxides, mixtures of actinide oxides with rare earth oxides and mixtures of actinide oxides with zirconium oxide at the top of a column of counterflowing solvent consisting of an alcohol having a solubility for water of 3 to 30% heated to a temperature of 0 to 50° C. below the boiling point of the solvent-water system,
 (b) drying said droplets to sinterable colloidal oxide-carbon spheres on settling through the solvent column, while
 (c) recirculating the solvent through a distillation system to recover water,
 (d) recovering the settled spheres, and
 (e) drying and sintering to dense carbide spheres.

5. A process for preparing dense carbide spherical particles having diameters in the range of 5 to 500 microns which comprises:
 (a) Forming sols of actinide oxides selected from the group consisting of thoria, urania, plutonia and mixtures thereof with carbon sols at the top of column of a counterflowing hexanol heated to a temperature of about 100° C.,
 (b) drying said droplets to sinterable colloidal oxide-carbon spheres on settling through the solvent column, while
 (c) recirculating the solvent through a distillation system to remove water,
 (d) recovering the settled spheres, and
 (e) drying and sintering to dense carbide spheres.

6. As a composition of matter, dried oxide-carbon spheres made up of dried colloidal oxide-carbon aquasol, said oxide selected from the group consisting of actinide oxides, mixtures of actinide oxides; mixtures of actinide oxides with rare earth oxides and mixtures of actinide oxides with zirconium oxides, said spheres being capable of sintering to dense carbide spheres.

7. As a composition of matter, dried-oxide-carbon spheres in the size range of 5 to 500 microns made up of dried colloidal oxide-carbon aquasols, said oxide selected from the group consisting of actinide oxides and mixtures of actinide oxides, said spheres being capable of sintering to dense carbide spheres.

8. As a composition of matter, dense oxide-carbon spheres made up of dried colloidal oxide-carbon aquasols, said oxide selected from the group consisting of urania and mixed urania-zirconia, said spheres being capable of sintering to dense carbide spheres.

References Cited

UNITED STATES PATENTS 3,171,715  3/1965  Kleinsteuber _____ 23—14.5

CARL D. QUARFORTH, *Primary Examiner.*

BENJAMIN R. PADGETT, L. DEWAYNE RUTLEDGE, *Examiners.*

S. TRAUB, R. L. GRUDZIECKI, *Assistant Examiners.*